(12) United States Patent
Lai et al.

(10) Patent No.: US 6,750,580 B2
(45) Date of Patent: Jun. 15, 2004

(54) PERMANENT MAGNET ROTOR HAVING MAGNET POSITIONING AND RETAINING MEANS

(75) Inventors: Ching-Feng Lai, Hsinchu (TW); Chun-Chung Yang, Hsinchu (TW); Tse-Liang Hsiao, Hsinchu (TW); Yu-Choung Chang, Hsinchu (TW); Kun-I Liang, Hsinchu (TW); Ann-Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 163 days.

(21) Appl. No.: 09/745,857

(22) Filed: Dec. 26, 2000

(65) Prior Publication Data
US 2002/0079770 A1 Jun. 27, 2002

(51) Int. Cl.[7] ................ H02K 21/14; H02K 15/02; H02K 15/03
(52) U.S. Cl. ................................. 310/156.28
(58) Field of Search .................. 310/156.28, 261, 310/265, 156.38; H02K 15/02, 15/03, 21/14

(56) References Cited

U.S. PATENT DOCUMENTS

| | | | | |
|---|---|---|---|---|
| 4,855,630 A | * | 8/1989 | Cole | 310/156.28 |
| 4,910,861 A | * | 3/1990 | Dohogne | 29/598 |
| 4,973,872 A | * | 11/1990 | Dohogne | 310/156.23 |
| 5,237,737 A | * | 8/1993 | Zigler et al. | 310/156.28 |
| 5,828,152 A | * | 10/1998 | Takeda et al. | 310/156.19 |

* cited by examiner

Primary Examiner—Dang Le
Assistant Examiner—Karen B Addison
(74) Attorney, Agent, or Firm—Troxell Law Office PLLC

(57) ABSTRACT

The present invention relates to a permanent magnet rotor permanent magnet positioning and retaining device comprising a sleeve, a rotor iron core properly provided therein, a plurality of arc-shaped permanent magnets of alternation poles disposed between the sleeve and the rotor, a plurality of near triangle-shaped regions between two adjacent permanent magnets being formed by cutting off the outer perimeter corners of two adjacent permanent magnets, wherein said rotor iron core further comprises a plurality of circumferentially provided grooves for separating two arc-shaped permanent magnets of alternating poles and a plurality of dividers, each being provided between two arc-shaped permanent magnets of alternating poles; said divider, between the rotor iron core and the sleeve, further comprises a base being engaged with a groove so that the dividers are secured to the rotor iron core, a trunk capable of filling the gap between two adjacent permanent magnets to prevent said permanent magnets from moving in circumferential direction, and a near triangle-shaped rim capable of forming tight engagement with said cut-off area so as to prevent permanent magnets from moving in radial direction.

16 Claims, 6 Drawing Sheets

PERMANENT MAGNET ROTOR HAVING MAGNET POSITIONING AND RETAINING MEANS

FIELD OF THE INVENTION

The present invention relates to a permanent magnet positioning and retaining device and in particular relates to a direct current brushless motor, capable of keeping permanent magnets of rotor in place under high-speed revolution.

BACKGROUND OF THE INVENTION

Conventional direct current brushless rotor comprises a rotor iron core, several arc-shaped permanent magnets around said rotor iron core, and a sleeve fit around and over said arc-shaped permanent magnets. Under revolution, the permanent magnets are pulled away in radial direction by centrifugal force so as to lose contact with the rotor iron core, thus creating magnetic impedance and affecting motor performance.

FIG. 1 shows a structural perspective of a sleeved direct current brushless rotor. In order to prevent magnetic flux leakage, gaps 15 and cut-off areas 14 are provided between adjacent arc-shaped permanent magnets 12. Under revolution, said gaps 15, however, prevent permanent magnets 12 from remaining in the same position and orientation. This causes instability in torque output and motor efficiency, produces noise and vibration, and affects overall motor performance.

FIG. 2 shows a structural perspective of a magnet positioning and retaining device in accordance with prior art U.S. Pat. No. 5,176,461. Though protrusions 24 provided between two permanent magnets 22 are intended for stopping the permanent magnets 22 from moving in circumferential direction, they are incapable of preventing said magnets 22 from shifting in radial direction. Furthermore, the centrifugal force generated by rotation forces the magnets 22 against the sleeve, causing stress, reducing and motor reliability and lifespan.

U.S. Pat. Nos. 5,828,152 and 6,084,330 are related prior arts with similar disadvantages shared by the embodiment of FIG. 2.

FIG. 3 shows a structural perspective of a magnet positioning and retaining device in accordance with the improved prior art U.S. Pat. No. 4,954,736. In the figure, the expanded portion 34 of an integral holding projection provided between two permanent magnets 32 fills the gap between two adjacent permanent magnets 32 so as to stop the movement of permanent magnets 32 in the circumferential direction. In addition, the near triangle-shaped structure provided on both ends of the contact region between a sleeve 33 and said expanded portion 34 can prevent radial shifting of permanent magnets 32. However, the good intention of reducing magnetic flux leakage by the cut-off design of permanent magnets 32 is offset by the use of integrally stamped silicon steel for said expanded portion 34, being a magnetic conducting material in direct contact with the magnets 32. Moreover, high cost associated with excess scrap material as a result of stamping process hinders said prior art from becoming commercially competitive.

Another related prior art U.S. Pat. No. 4,910,861 reveals plastic filling for the gap between permanent magnets. Yet in high-speed revolution, the loaded rotor generates heat, which softens plastic fillings and undercut their strength of holding permanent magnets in place. Again, the lifespan and reliability of rotor remain unsatisfactory.

The prior arts and the improved ones as discussed above fail to provide answers for resolving the aforementioned discrepancies. The quest to solutions stays a priority for those skilled in the art.

SUMMARY OF THE INVENTION

An object of the present invention is to provide a permanent magnet rotor magnet positioning and retaining device, capable of preventing circumferential and radial shifting of permanent magnets, thereby ensuring overall motor performance, reliability and lifespan.

Another object of the present invention is to provide a divider made from poor or non-magnetically conducting material for making direct contact with permanent magnets and for preventing magnetic flux leakage.

To that end, the present invention reveals a permanent magnet rotor magnet positioning and retaining device, comprising a sleeve, a rotor iron core, at least one arc-shaped permanent magnet, and a plurality of dividers wherein said sleeve has a hollow tubular structure; said rotor iron core comprises a least one groove circumferentially provided in the proper locations inside said sleeve; said arc-shaped permanent magnets of alternating poles provided between said sleeve and said rotor iron core are separated from one another by said dividers, said arc-shaped permanent magnets each having a cut-off area in outer perimeter corners of two adjacent permanent magnets so as to form a near triangle-shaped region between two adjacent permanent magnets; a plurality of dividers, provided between permanent magnets of alternating poles, comprises a base, a trunk and a rim; wherein said base is engaged with a groove so that the dividers are secured to the rotor iron core; said trunk fills the gap between two adjacent permanent magnets to prevent said permanent magnets from moving in circumferential direction; and said rim has a near triangle-shaped structure in close contact with said cut-off area (in outer perimeter corners of two adjacent permanent magnets) so as to prevent permanent magnets from moving in radial direction.

The following Description and Designation of Drawings are provided in order to help understand the features and content of the present invention.

BRIEF DESCRIPTION OF THE DRAWINGS

The accompanying drawings form a material part of this description, in which.

DETAILED DESCRIPTION OF THE PREFERRED EMBODIMENT

The main feature of the present invention includes adopting grooves circumferentially provided in the rotor of a sleeved direct current brushless motor wherein said groove separates two arc-shaped permanent magnets of alternating poles. A divider comprising a base, a trunk and a rim is further provided between said two arc-shaped permanent magnets of alternating poles wherein said base is in tight engagement with the rotor, said trunk fills the gap between two adjacent permanent magnets to prevent said permanent magnets from moving in circumferential direction, and said rim has a near triangle-shaped structure in close contact with said cut-off area (in outer perimeter corners of two adjacent permanent magnets) so as to prevent permanent magnets from moving in radial direction. The mechanisms for preventing circumferential and radial ensure proper operation and motor reliability.

Figure 1:
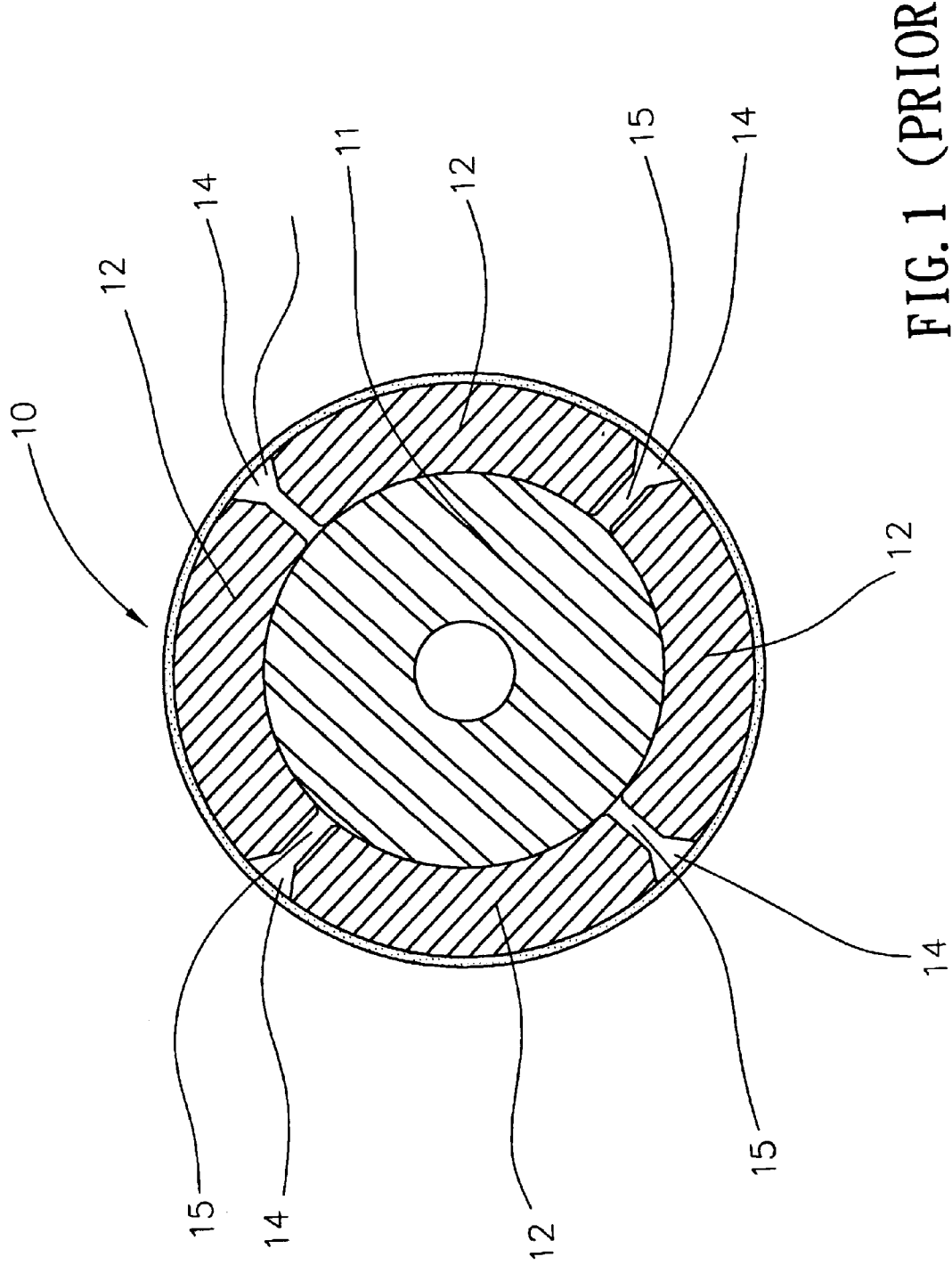
FIG. 1 is a structural perspective of a conventional direct current brushless rotor.
Figure 2:
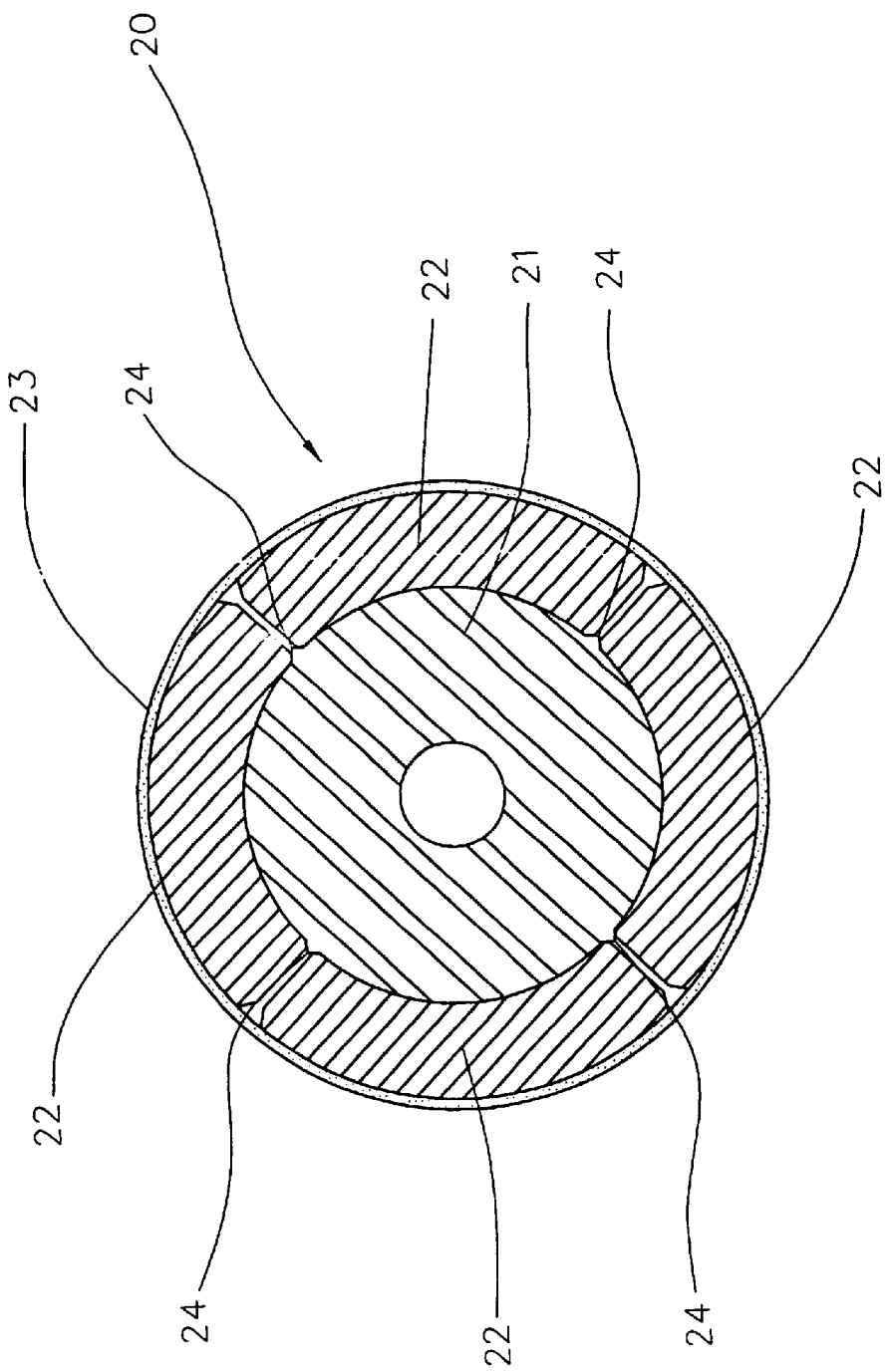
FIG. 2 is a structural perspective of a magnet positioning and retaining device in accordance with a prior art.
Figure 3:
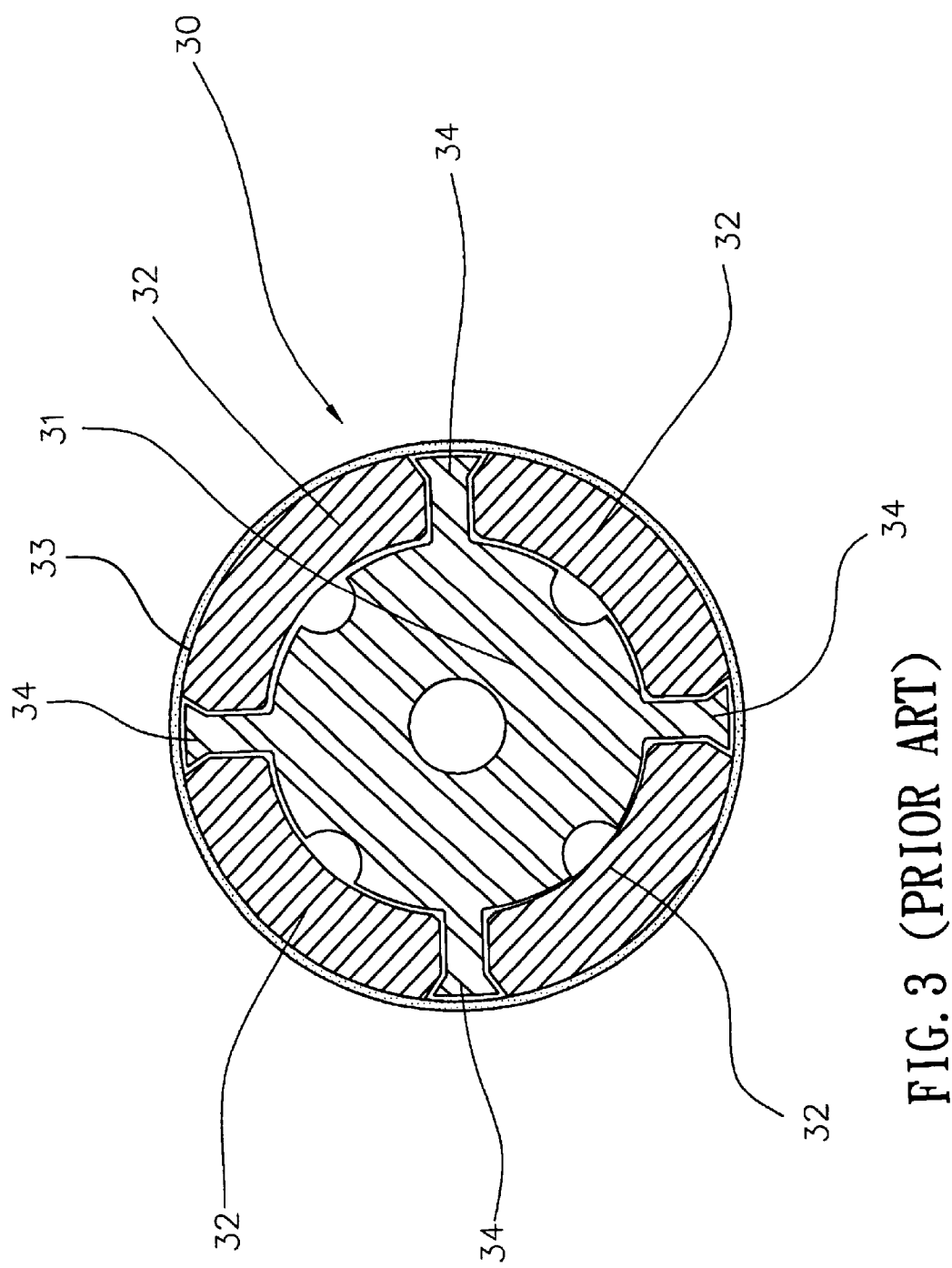
FIG. 3 is a structural perspective of a magnet positioning and retaining device in accordance with an improved prior art.
Figure 4A:
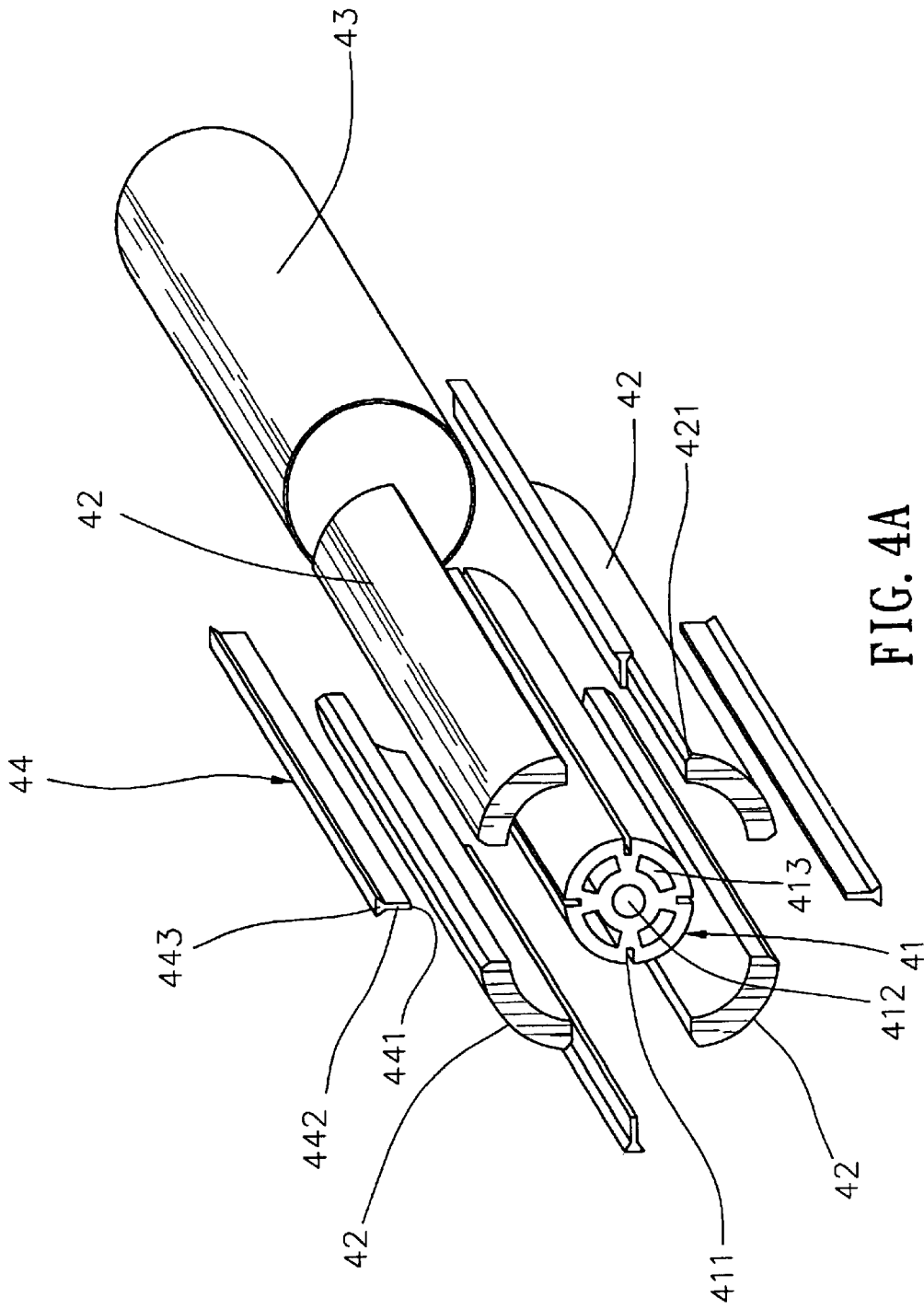
FIG. 4A is a 3-dimensional perspective of a permanent magnet rotor magnet positioning and retaining device in accordance with the first embodiment of the present invention.
Figure 4B:
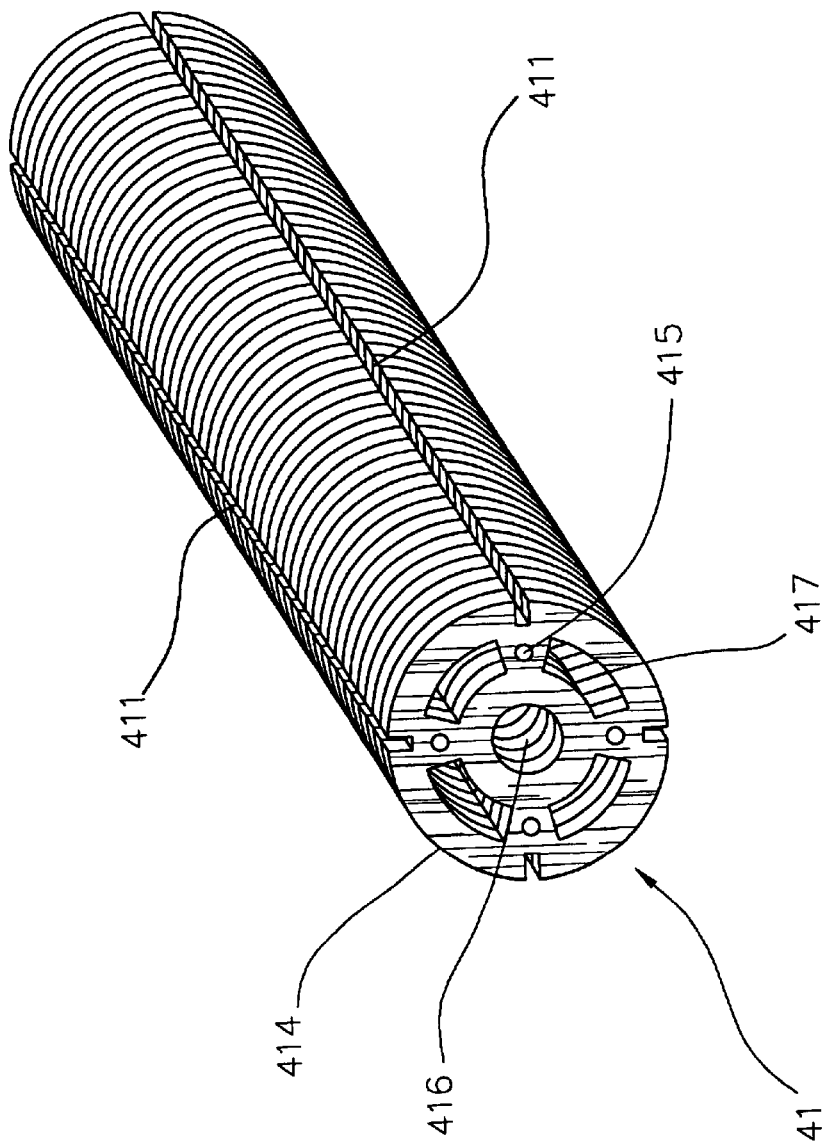
FIG. 4B is a structural perspective of a rotor iron core of FIG. 4A in accordance with the first embodiment of the present invention.

A magnet positioning and retaining device and a rotor iron core, both in accordance with the first embodiment of the present invention, are shown in FIG. 4A and FIG. 4B, respectively. Said magnet positioning and retaining device comprises a sleeve 43, a rotor iron core 41, at least one arc-shaped permanent magnet 42, and a plurality of dividers 44. Said sleeve 43 has a hollow tubular structure. Said rotor iron core 41 comprises a least one groove 411 circumferentially provided in the proper locations inside said sleeve 43.

Said rotor iron core 41 in this embodiment, comprising at least one steel plate 411 being stacked together (See FIG. 4B), is a round steel pole made of silicon steel material having excellent magnetic conductivity, though other magnetically conducting materials are suitable candidates as well. Said rotor iron core 41 further comprises a shaft hole 412 in the center for accepting shaft and a plurality of narrow arc-shaped holes 413 circumferentially disposed around said shaft hole 412 for reducing rotor weight and cutting material cost.

Said rotor iron core 41 in the first preferred embodiment, as shown in FIG. 4B, includes a plurality of round-shaped thin steel plates 414 being stacked together, each steel plates 414 being stamp-fabricated from silicon steel material having excellent magnetic conductivity or other magnetically conducting materials. Individual steel plates 414, each having a plurality of elevations 415 on one side and a plurality of corresponding depressions on the opposite side thereof, are stacked one upon another with coincident depressions, so as to provide proper orientation. Said individual steel plates 414 further comprise a shaft hole 416 in the center for accepting shaft and a plurality of narrow arc-shaped holes 417 circumferentially disposed around said shaft hole 416 for reducing rotor weight and cutting material cost.

At least one arc-shaped permanent magnet 42 of alternating poles provided between said sleeve 43 and said rotor iron core 41 are separated from one another by grooves 411, each arc-shaped permanent magnet having a cut-off area 421 in outer perimeter corners of two adjacent permanent magnets so as to form a near triangle-shaped region between two adjacent permanent magnets.

Preferably, a plurality of dividers 44, provided between arc-shaped permanent magnets 42 of alternating poles, are made from a hard material having poor or none magnetic conductivity. The advantages are two fold: (1) When the motor rotates in high speed and rotor temperature rises rapidly, the divider will not lose the strength to hold the magnets in place, and (2) Using material of poor or none magnetic conductivity and adopting cut-off area disclosed in the foregoing, the magnetic flux leakage could be prevented.

Individual dividers 44, provided between said rotor iron core 41 and said sleeve 43, further comprise a base 441, a trunk 442 and a rim 443.

Said base 441 is engaged with a groove 411 so that the dividers 44 are secured to the rotor iron core 41. Said trunk 442 fills the gap between two adjacent permanent magnets 42 to prevent said permanent magnets 42 from moving in circumferential direction. Said rim 443 has a near triangle-shaped structure in close contact with said cut-off area 421 (in outer perimeter corners of two adjacent permanent magnets) so as to prevent permanent magnets 42 from moving in radial direction.

The groove 411 in accordance with this embodiment of the present invention is a rectangle-shaped groove that fits closely with said base 441 of rectangle-shaped protrusion so as to allow the divider 44 secure to the rotor 41. Said rim 443 has a near triangle-shaped structure in close contact with said cut-off area 421 (in outer perimeter corners of two adjacent permanent magnets) so as to stop permanent magnets 42 from shifting in radial direction.

Figure 5:
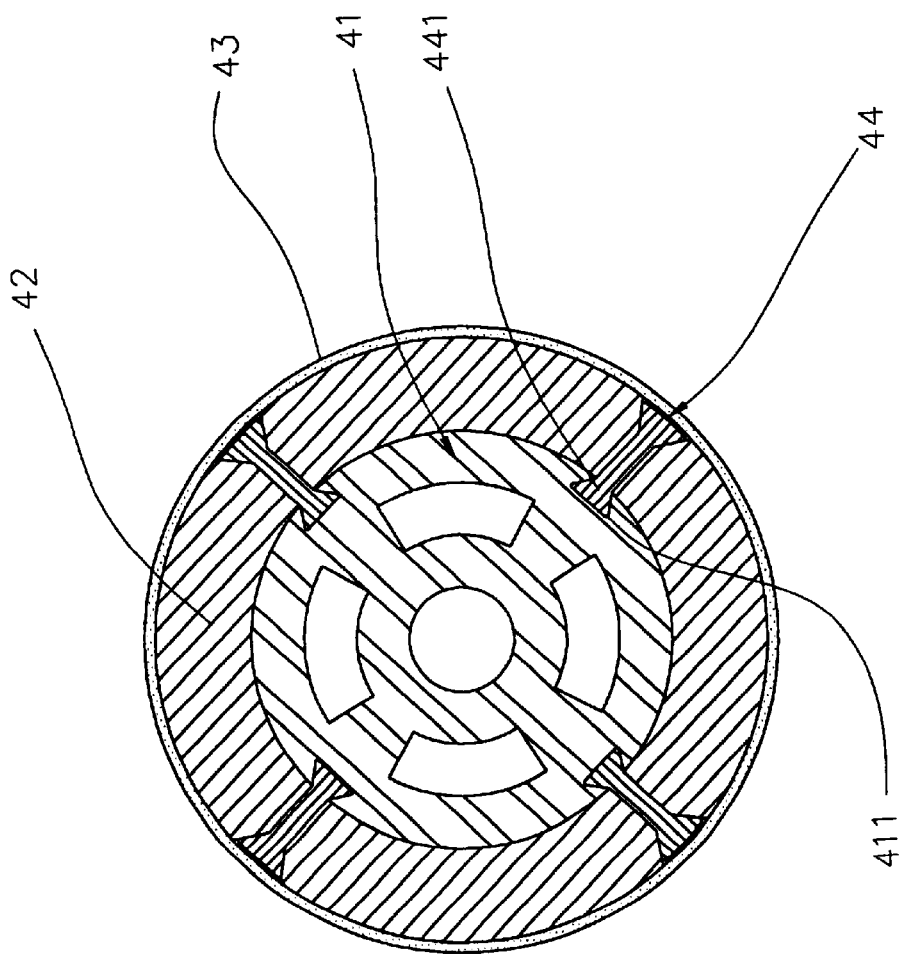
FIG. 5 is a structural perspective of a permanent magnet rotor magnet positioning and retaining device in accordance with the second embodiment of the present invention.

FIG. 5 shows a permanent magnet rotor magnet positioning and retaining device in accordance with the second embodiment of the present invention. The groove 411 is a trapezoid-shaped groove that fits closely with said base 441 of trapezoid-shaped protrusion so as to allow the divider 44 secure to the rotor 41 while the rotor rotates.

Four permanent magnets and four dividers are provided in the above embodiments, though six, eight or more are feasible as well.

In light of the foregoing, the present invention discloses a novel rotor magnetic positioning and retaining device capable of stopping permanent magnets from circumferential and radial shifting, as well as preventing magnetic flux leakage.

While we have shown and described several embodiments in accordance with the present invention, it is understood that the same is not limited thereto, but is susceptible to numerous changes and modifications as is known in the art; and we therefore do not wish to be limited to the details shown and described herein, but intend to cover all such modifications as are encompassed by the scope of the appended claims.

What is claimed is:

1. A permanent magnet rotor magnet positioning and retaining device comprising:

a sleeve having a hollow tubular structure;

a rotor iron core having a plurality of grooves and located inside said sleeve, wherein said rotor iron core includes a plurality of steel plates stacked together, each steel plate having a plurality of elevations on one side and a plurality of corresponding depressions on an opposite side, the steel plates being stacked one upon another with coincident depressions, so as to provide a proper orientation;

a plurality of arc-shaped permanent magnets of alternating poles provided between said sleeve and said rotor iron core, and being circumferentially spaced from one another, said arc-shaped permanent magnets each having a cut-off area on outer perimeter corners of two adjacent permanent magnets so as to form a triangle-shaped region between two adjacent permanent magnets; and a plurality of dividers, each being provided between two adjacent permanent magnets of alternating poles, having:

a base closely engaged with one of the plurality of grooves so that the dividers are secured to the rotor iron core;

a trunk filling a gap between two adjacent permanent magnets so as to prevent said permanent magnets from moving in a circumferential direction; and a rim having a triangle-shaped structure in contact with said cut-off area so as to prevent the permanent magnets from moving in a radial direction.

2. The permanent magnet rotor magnet positioning and retaining device of claim 1, wherein said steel plates are silicon steel plates.

3. The permanent magnet rotor magnet positioning and retaining device of claim 1, wherein said steel plates further comprises a shaft hole in a center thereof and a plurality of narrow arc-shaped holes circumferentially provided around said shaft hole.

4. The permanent magnet rotor magnet positioning and retaining device of claim 1, wherein said steel plates are stamp-fabricated.

5. The permanent magnet rotor magnet positioning and retaining device of claim 1, wherein four permanent magnets and four dividers are provided.

6. The permanent magnet rotor magnet positioning and retaining device of claim 1, wherein said grooves are rectangle-shaped grooves fitting closely with rectangle-shaped bases so that said grooves and said bases are in tight engagement.

7. The permanent magnet rotor magnet positioning and retaining device of claim 1, wherein said grooves are trapezoid-shaped grooves fitting closely with trapezoid-shaped bases so that said grooves and said bases are engaged in sliding fashion.

8. The permanent magnet rotor magnet positioning and retaining device of claim 1, wherein said dividers are made from a hard material having poor magnetic conductivity.

9. The permanent magnet rotor magnet positioning and retaining device comprising:
- a sleeve having a hollow tubular structure;
- a rotor iron core having a plurality of grooves and located inside said sleeve, wherein said rotor iron core includes a plurality of round steel plates stacked together, each steel plate having a plurality of elevations on one side and a plurality of corresponding depressions on an opposite side, the steel plates being stacked one upon another with coincident depressions, so as to provide a proper orientation;
- a plurality of arc-shape permanent magnets of alternating poles provided between said sleeve and said rotor iron core, and being circumferentially spaced from one another, said arc-shaped permanent magnets each having a cut-off area on outer perimeter corners of two adjacent permanent magnets so as to form a triangle-shaped region between two adjacent permanent magnets; wherein
- said rotor iron core further comprises a plurality of dividers, each being provided between two adjacent arc-shaped permanent magnets of alternating poles;
- each of said dividers, between the rotor iron core and the sleeve, further comprising a base engaged with one of the plurality of grooves so that the dividers are secured to the rotor iron core, a trunk filling a gap between two adjacent permanent magnets to prevent said permanent magnets from moving in a circumferential direction, and a triangle-shaped rim forming tight engagement with said cut-off area so as to prevent the permanent magnets from moving in a radial direction.

10. The permanent magnet rotor positioning and retaining device of claim 9, wherein said steel plates are silicon steel plates.

11. The permanent magnet rotor magnet positioning and retaining device of claim 9, wherein said steel plate further comprises a shaft hole in a center thereof and a plurality of narrow arc-shaped holes center thereof and a plurality of narrow arc-shaped holes circumferentially provided around said shaft hole.

12. The permanent magnet rotor magnet positioning and retaining device of claim 9, wherein said steel plates are stamp-fabricated.

13. The permanent magnet rotor magnet positioning and retaining device of claim 9, wherein four permanent magnets and four dividers are provided.

14. The permanent magnet rotor magnet positioning and retaining device of claim 9, wherein said grooves are rectangle-shaped grooves fitting closely with rectangle-shaped bases so that said grooves and said bases are in tight engagement.

15. The permanent magnet rotor magnet positioning and retaining device of claim 9, wherein said grooves are trapezoid-shaped grooves fitting closely with trapazoid-shaped bases so that said grooves and said bases are engaged in sliding fashion.

16. The permanent magnet rotor magnet positioning and retaining device of claim 9, wherein said dividers are made from a hard material having poor magnetic conductivity.

* * * * *